Feb. 3, 1931.  H. J. MURRAY  1,791,478
ROCKING ARM SWITCH
Filed March 3, 1925
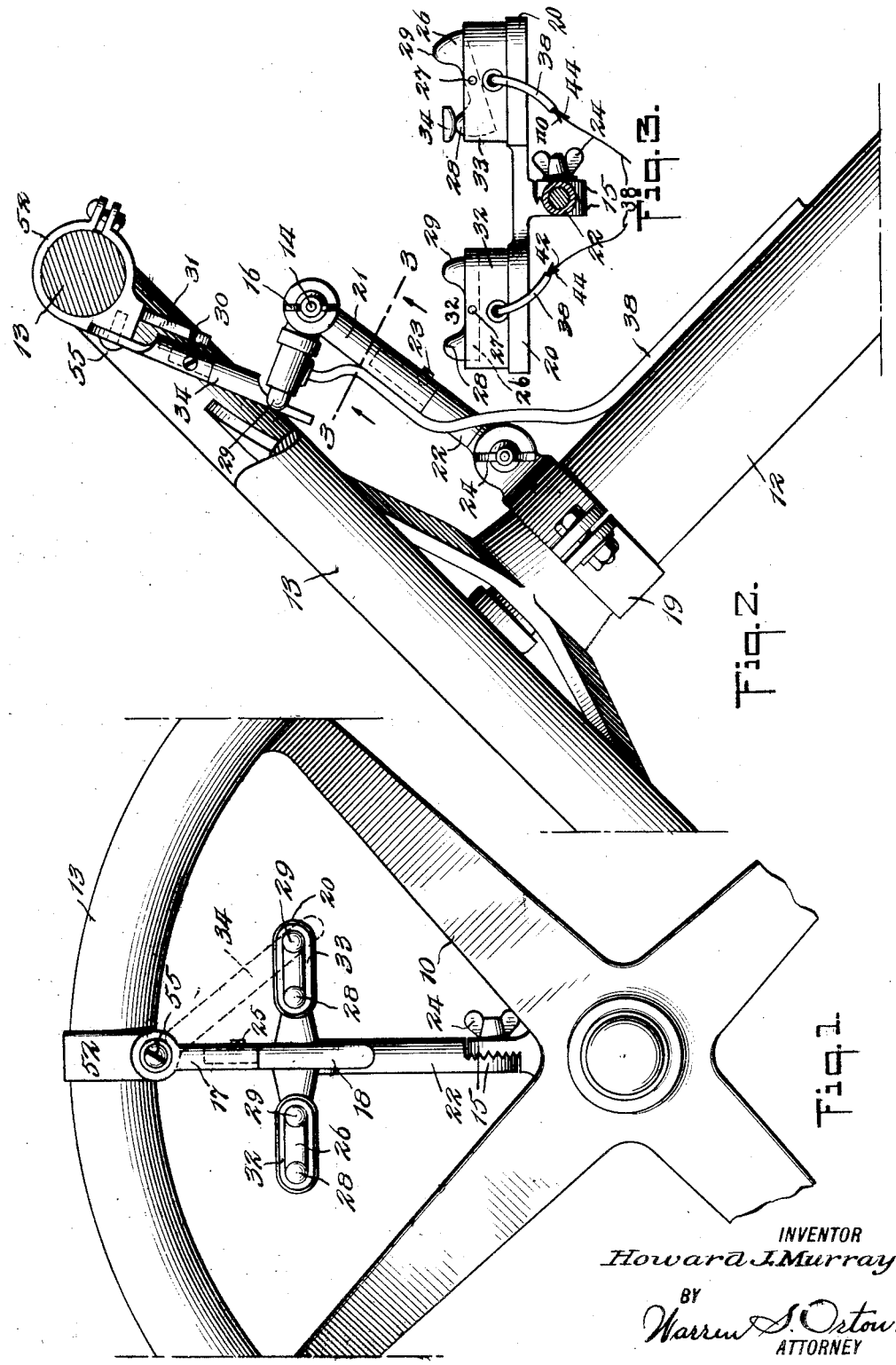
INVENTOR
Howard J. Murray
BY
Warren S. Orton.
ATTORNEY Patented Feb. 3, 1931

1,791,478

UNITED STATES PATENT OFFICE

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE

ROCKING-ARM SWITCH

Application filed March 3, 1925. Serial No. 12,989.

The invention relates to a traffic signaling device of the type commonly found on automotive vehicles for the purpose of indicating the intent of the operator to effect a turning or stopping of the vehicle and the present disclosure constitutes a further development of the inventions defined in applications Serial Nos. 634,620, filed April 25, 1923; 650,010, filed April 7, 1923; 650,011, filed July 7, 1923; 678,831, filed December 6, 1923; 650,347, filed December 13, 1923; 716,581, filed May 29, 1924; 749,378, filed November 12, 1924 and 949, filed January 7, 1925.

More specifically defined the invention relates to a manually actuated switch for the several indicating signals usually found on automotive vehicles and which switch may be operated as a positive overt act on the part of the operator or may be operated incidental to the movement of the steering wheel in effecting its steering operation or the switch may be actuated simultaneously with the movement of some other part of the control elements of the vehicle mechanism.

The primary object of the invention is to provide a form of connection between the control switch and the wheel which will minimize wear of the parts while in use. This object is attained by providing a form of control for the signal devices which control will be free of all connections both mechanical and electrical between the steering mechanism and the several controlling switches during the normal forward driving of the vehicle and which connections will be established only after the steering wheel has been turned over a preset angle in either direction.

Another object of the invention is to provide a simplified form of switch which can be marketed as a unit, designed to be installed on any conventional form of steering column or other mounting element and easily connected without necessity of mutilating or disarranging any of the conventional parts of the steering column, wheel or other vehicle controlling element.

Broadly I attain this phase of the invention in the illustrated embodiment of the invention by mounting in fixed position a pair of circumferentially placed apart rockable switches or other suitable forms of circuit closers, and dispose the same so that they may be actuated manually as is usual with such types of rockable switches and which may also be rocked to effect the desired closing of the selected circuit automatically by the rotation of the steering wheel incidental to its steering action.

In the present disclosure it is to be understood that one position where the use of the device herein disclosed is particularly applicable is to take the place of the switches 32 and 34 in co-pending application Serial No. 949, filed January 7, 1925.

Another object of the invention is to provide in the organization outlined an arrangement of switches or circuit closers which will be restored automatically to their normal inoperative or circuit breaking position as an incident to the return of the steering wheel to its normal, straight forward driving position and in which the switch parts are automatically restored to their normal circuit breaking position incident to the return to normal of the steering mechanism.

Still another object of the invention is to provide a form of switch or circuit closing device which will be free of springs or other resetting mechanism which might get out of order and in general the invention features simplicity in construction over the similar devices disclosed in the above identified co-pending applications.

Various other objects and advantages of the invention will be in part obvious from an inspection of the accompanying drawings and in part will be more fully set forth in the following particular description of one form of device embodying my invention and the invention also consists in certain new and novel features of construction and combination of parts hereinafter set forth and claimed.

In the accompanying drawings:—

Figure 1 is a plan view looking down upon a fragmentary portion of a vehicle steering wheel showing a preferred embodiment of the invention mounted thereon and with the manual control shown in dotted outline in position closing the circuit through a right direction indicating signal.

Figure 2 is a view in side elevation of the device shown in Figure 1 and showing the parts in position in their normal inoperative position; and Figure 3 is a transverse sectional view taken on the line 3—3 of Figure 2 looking in the direction indicated by the arrow and showing the control swinging the right hand switch into normal inoperative position.

In the following description and in the claims, parts will be identified by specific names for convenience of expression but they are intended to be as generic in their application to similar parts as the art will permit.

In the drawings reference characters 32, 33, 34, 38, 40, 42 and 44 are taken from application Serial No. 949 and characters 10, 12, 13, 19, 20, 21, 22, 23, 24, 52 and 55 are taken from application Serial No. 749,378 to show corresponding parts.

In the drawings there is shown part of a steering wheel 10 mounted for rotary movement on the fixed column 12 and provided with the usual steering rim 13. It will be further assumed that the vehicle is provided with some suitable form of electric direction indicating signaling device of an electrically actuated type and which device is controlled selectively by a pair of circuit closers 32 and 33 constituting a single unit and particularly constituting the subject matter of this disclosure.

It may be further assumed that the circuit closer 32 is operatively connected to control the circuit through a left direction indicating signal and that the right circuit closer 32 is similarly connected to close and open the circuit through a right direction indicating signal.

When considered in connection with its use as part of the control system disclosed in co-pending application Serial No. 949, it will be understood that current is supplied to both switches from a suitable source of electric energy through a bifurcated main feed line 38 leading to the movable elements of the switches and that the closing of either switch will complete the circuit through conductors 44 to energize a signal device controlling motor; that conductor 40 leads from switch 33 to the right direction indicating signal and conductor 42 similarly leads from circuit closer 32 to the left direction indicating signal all as is more fully disclosed in co-pending application Serial No. 949.

The circuit closers 32 and 33 are designed to be secured together so as to be marketed as a unit together with the necessary attaching means herein shown to be a strap 19 for encircling the column 12. In general means are provided for securing the circuit closer unit in fixed position relative to the wheel and preferably in an out-of-the-way position beneath the steering wheel. The circuit closers may be regarded as separate units each secured to a main casting 20 rockably mounted on a radially extending post 21 adjustably mounted on an arm 22. The post is secured in radially adjusted position on the arm by means of a set screw 23. The arm 22 is secured to the strap 19 for adjusted rotary movement vertically and is clamped in its adjusted position by means of a wing nut 24.

The movable elements of the switches are controlled either manually or by the rotary movement of the wheel in effecting its steering operation. In the latter case an actuating finger 34 secured to the rim in prelocated position by means of a fastener 52 moves across the movable elements to trip the same to and from their circuit closing positions. The finger fastener 52 is shown to be a split ring strap clamped to the rim preferably so that the finger will normally extend across the space between adjacent wheel spokes. The finger is pivotally connected to the split ring by means of a pivot pin 55 and swings in a plane approximately in the plane of the steering wheel.

The present disclosure features additional details of adjustment; it being noted that casing 20 is mounted for adjustment relative to the post 21 so as to swing the circuit closers 32 and 33 radially of the wheel and for this purpose the casting 20 is mounted for rotary movement about a transversely extending shaft 14 carried at the outer end of the arm 21 and is secured in rotatably adjusted position by means of a two-jawed clamp 15 and locked in its adjusted position by wing nut 16.

In order to provide for adjustment in length of the actuating finger 34 it is shown to comprise two parts, 17 and 18 secured in adjusted position axially by binding screw 25.

The circuit closers 32 and 33 are of similar construction so that the detailed construction of one will apply equally to the other. The movable element 26 of each switch is of the rockable type, centrally pivoted on pin 27 and provided at opposite ends with up-standing rounded top humps 28 and 29 disposed in line and in the path of movement of the finger 34 when it is swung manually from the full line into the dotted line position shown in Figure 1 or when it maintains its diametrically extending position and moves into contact with the humps by the rotary movement of the steering wheel.

It is understood that depressing the outer hump, that is, the right hand hump 29 in Figure 3 of the circuit closer 33, will close the circuit from the source of electric energy, indicated by the conductor 38 through both of the conductors 40 and 44. Similarly depressing the left-hand or outer hump 28 of circuit closer 32 will similarly close the circuit from the main feed line 38 through both of the conductors 42 and 44. In all other positions of the rocking element 26 the circuit closers are open and no current is flowing from the source.

In order to insure the return of the actuating finger 34 to its normal radially disposed position shown in full lines in Figure 1, resilient stop and resetting means are disclosed. These means include a pin 30 depending from the finger 34 and engaging between the bifurcated ends of a spring 31 extending radially from the split ring fastener 52.

In operation and assuming that the control finger is positioned between the switches or circuit closers 32 and 33 while the vehicle is in its straight forward steering direction the controlled signals will be idle and not functioning. It will be understood that should the operator desire to indicate that he is about to turn to the right he may depress the right hand hump of the circuit closer 33 or he may swing the actuating finger to the right and into the position shown in dotted lines in Figure 1. In either case the lowering of the right hand hump 29 will close the circuit through the right hand signal device as hereinbefore described. Should this preindication be followed by an actual steering movement of the wheel to effect the right turning movement of the vehicle the finger 34 will momentarily depress the left hand hump if it should happen to be elevated. This, of course, will break the circuit, but the continued movement of the actuating finger will engage the previously elevated right hand hump and again depress it into its lowered, circuit closing position. Should the operator turn to the right without previously actuating the circuit closer by manual manipulation the revolving swinging finger will be carried by the wheel rim into engagement with the left hand hump 28 of circuit closer 33 as indicated in Figure 3, and the continued movement will engage the outer elevated hump depressing the same and thus initially closing the circuit through the right direction indicating device. The steering wheel is then free to move past the circuit closer thus set to actuate the signal and may move freely into any desired steering position. The steering wheel is free to move as much as the usual 270° permitted in present forms of steering gear constructions. In the meantime the circuit closer is left in its circuit closing position and will remain in this position until it is positively or automatically restored to its normal circuit breaking position. It will thus be seen that the right hand signal is functioning as long as the steering wheel is in its vehicle steering position to cause a turn to the right. As the steering wheel is moved back to its normal forward driving position, the finger 34 passes over the depressed hump which at this time is below the path of movement of the finger and engages the inner elevated hump lowering the same and breaking the circuit as indicated in Figure 3. It is immaterial insofar as this disclosure is concerned whether the rocking element of the circuit closer be in the horizontal disposed position shown at the left in Figure 3 or that the inner hump be depressed as shown at the right hand side of Figure 3. In either case the circuit is broken.

It is obvious that a similar movement of the steering wheel to the left would correspondingly close the circuit through the left direction indicating system controlled by the circuit closer 32.

By means of a device of this character it is possible to provide an extremely simple form of circuit closer for controlling the right and left indicating signals on a motor vehicle. The movable element is easily engaged by the operator even though his hands be encased in heavy gloves, for by a sweeping movement of the hand to the right or left the broad headed hump may be easily found, engaged and manipulated to open or close its associated circuit as desired.

It is a feature of this disclosure that no springs or other locking or normalizing mechanism is needed; the construction simply requiring conventional form of fixed contacts and a rockably mounting of the control element.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. An attachment for mounting a vehicle steering mechanism of different dimensions, said attachment including a circuit closure including a manually actuated movable control member normally exposed for ready access whereby the same may be actuated by direct manual engagement, and provided with means for securing the same in fixed position on the steering column, said attachment also including an actuating member provided with means for securing the same to the rim of the steering wheel and providing means whereby the same can be shifted manually, said actuating member being operatively disposed to move said control member into and from its circuit closing position either by the manual actuation of said actuating member or automatically incidental to the turning movement of the steering wheel, said circuit closer and said actuating member provided with means for adjusting their relative positions and thus permit the attachment to be fitted to different sizes of steering mechanisms.

2. In a device of the class described, the combination of a circuit closer provided with means for mounting the same in fixed position disposed between the hub and rim of a steering wheel and provided with a control member rockably mounted and having two finger engaging parts facing upwardly and providing manual engaging surfaces adapted to be exposed between the spokes of the steering wheel so as to be rocked by direct manual engagement therewith, an actuating finger provided with means for pivoting the same to the rim of the steering wheel having a path of movement across said exposed control member for rocking the same mechanically, said finger movable in one direction into engagement with one of the parts for closing the circuit closer and movable in the other direction into engagement with the other part for opening the circuit closer.

3. In a device of the class described, the combination with an automobile steering mechanism of a pair of circuit closers including a movable element pivotally mounted on the steering mechanism and provided on opposite sides of its pivotal mounting with an upstanding hump, said humps having rounded tops both tangent to a plane, and when so disposed said circuit closer being in its normal open position, and an actuating member pivotally mounted on the steering mechanism and adapted to be swung relative to the part on which it is mounted, said member provided with a part constituting a handle for engaging the same to actuate the circuit closer selectively, manually and independently of the steering mechanism, said member having a normal, inoperative position between the circuit closers, movable therefrom parallel to said plane, both with the turning of the steering mechanism as well as by manual operation independent of the movement of the steering mechanism, operable in one direction to depress one of the humps and elevate the other and thus close the circuit closer, and said member movable in the opposite direction to depress and restore to normal position the elevated hump and thus restore the circuit closer to its normal open position.

4. In a device of the class described, the combination with a vehicle steering mechanism including a fixed column and a wheel provided with a steering rim, of a two part attachment adapted to be secured to the steering mechanism, one of said parts comprising a circuit closer unit including a pair of circuit closers and means for securing the unit to the fixed column to dispose the circuit closers facing the space between the hub and rim of the wheel, said circuit closers being spaced circumferentially of the wheel, each circuit closer including a movable element pivotally mounted and provided on opposite sides of its pivotal mounting with an upstanding hump exposed for manual actuation, the other part comprising an actuating finger pivotally mounted at one end to the rim of the steering wheel and adapted to be moved into operative engagement selectively with either one of the circuit closers depending on the direction of turn either by manual action or automatically by the turning of the wheel, spring means tending to hold the finger radially and said finger normally disposed between the circuit closers and operable in one direction from said normal position to depress one of the humps and elevate the other and thus close the circuit closer and said member movable in the opposite direction back towards said normal position to depress and restore to normal the elevated hump.

5. A signal controlling attachment for a vehicle steering mechanism comprising two separate units physically disconnected to fit steering wheels of different diameters, one unit constituting a circuit closer provided with means for mounting the same on the fixed steering column of the mechanism and including an upwardly facing movable element exposed for manual actuation, the second unit comprising a spring biased actuating finger provided with means for pivotally mounting the same on the rim of the steering wheel in position to engage the movable element of the circuit closer and actuate the same automatically when the steering wheel is turned and manually when the operator swings the finger manually towards and past the circuit closer.

Signed at New York city, in the county of New York and State of New York this 18th day of February, A. D. 1925.

HOWARD J. MURRAY.